Patented June 17, 1947

2,422,252

UNITED STATES PATENT OFFICE 2,422,252

TRANSPOSITION OF DICHLOROBUTENES

Julian A. Otto, Long Island City, N. Y., assignor to General Chemical Company, New York, N. Y., a corporation of New York No Drawing. Application September 15, 1944, Serial No. 554,333

8 Claims. (Cl. 260—654)

This invention relates to production of either of the dichlorobutenes 1,4-dichlorobutene-2 or 1,2-dichlorobutene-3, by transposing the one isomer into the other by molecular rearrangement.

1,2-dichlorobutene-3 and 1,4-dichlorobutene-2 are generally both formed when it is attempted to produce dichrlorobutenes by such processes as the chlorination of butadiene. At present the 1,4-dichlorobutene-2 is considered of much greater importance than its isomer, being useful as an intermediate for the production of synthetic organic chemicals. There are indications, however, that with changing economic and industrial conditions, the 1,2-dichlorobutene-3 isomer may, in some future time, greatly surpass in importance the 1,4-dichlorobutene-2 compound. Accordingly, it is most desirable that useful industrial processes should be provided for transposing either of these dichlorobutenes into its isomer.

Attempts have been made heretofore to convert each of these dichlorobutenes into its isomeric compound. Thus, an article by Muskat and Northrup in the Journal of the American Chemical Society (vol. 52, pages 4043–4055) states that whereas the dibromobutenes readily rearrange into their isomeric forms, the two dichlorobutenes under discussion are stable and cannot be rearranged into isomeric compounds either upon repeated distillation at atmospheric pressure, or upon prolonged heating in a pressure bomb.

More recently a process has been suggested in United States Patent 2,242,084 of May 13, 1941 for converting 1,2-dichlorobutene-3 into 1,4-dichlorobutene-2. This process, however, involves the use of condensation and polymerization catalysts such as $FeCl_3$, $TiCl_4$, $ZnCl_2$ and $AlCl_3$, and with such catalysts elaborate precautions must, of course, be taken to avoid such undesirable side reactions as the polymerization or condensation of these very active unsaturated organic chlorides. The patent indicates, for example, that it is necessary in order to avoid such side reactions to take such precautions as the maintenance of an extremely low temperature during the transposition, e. g. preferably a temperature of about 0° C. and at most a temperature not higher than 50° C., as well as such other precautionary measures as the slow and gradual addition of the catalyst with constant stirring to avoid local overheating with resultant increased side reactions and the quick addition of water to inactivate the catalyst and stop the reaction when there is danger of condensation or polymerization taking place.

Although the use of these condensation catalysts to promote the conversion is thus undesirable because of the elaborate precautions that must be taken, the prior art (see for example the Muskat and Northrup article) teaches that the conversion of either of the dichlorobutenes under discussion to its isomer is not possible under any conditions without these catalysts. Moreover, although the use of elevated temperatures for a chemical reaction of this type is generally advantageous because of the greater ease of control of the operation as well as the increased rate of reaction attendant upon the use of the higher temperatures, and because products and reactants may be readily separated and purified by distillation at atmospheric pressure when the operations involved in the conversion can be carried out at elevated temperatures, the whole teaching of the prior art is that the conversion can never be carried out at elevated temperatures since in the absence of the catalyst the prior art states no conversion is obtained, whereas in the presence of the prior art catalysts, not only must elevated temperatures be avoided, but in many cases even room temperatures must be avoided because of the danger of such undesirable side reactions as polymerization or condensation.

It is an object of this invention to provide a new process for transposing either of the dichlorobutenes—1,4-dichlorobutene-2 or 1,2-dichlorobutene-3—to the other isomer with the employment of an elevated temperature and all its attendant advantages, but without such undesirable side reactions as polymerization or condensation of the unsaturated organic compounds involved.

I have discovered that the dichlorobutenes—1,2-dichlorobutene-3 and 1,4-dichlorobutene-2—may each be transposed to the other isomer by subjecting the dichlorobutene which it is desired to convert into its isomer to a temperature of at least about 120° C. The transposition of the dichlorobutene may be carried out by heating the material under reflux conditions at a temperature of 120° C. or above or by passing the dichlorobutene in vapor form through a tube maintained at the temperatures indicated, or by other means known in the art, batchwise or continuous.

This conversion of one of the dichlorobutenes—1,2-dichlorobutene-3 or 1,4-dichlorobutene-2—to the other isomer is based on my discovery that at elevated temperatures these two isomers are in dynamic equilibrium, contrary to the teaching of the art that both compounds are stable at high temperatures. This equilibrium mixture, I have found, contains substantial amounts of both the 1,4-dichlorobutene-2 isomer and the 1,2-dichlorobutene-3 isomer, the 1,4-isomer generally predominating. Accordingly, starting with either one of these two dichlorobutenes, by following the process of my invention a substantial proportion of this dichlorobutene may be converted into its isomer; and since this conversion is carried out at a temperature at which separation of the two isomers, for example by distillation, is convenient, the unconverted portion of the starting material may advantageously be separated and recycled for further treatment by the process of my invention to convert it to its isomer. Following such a procedure, I have found that either of the dichlorobutenes—1,2-dichlorobutene-3 or 1,4-dichlorobutene-2—may be converted to the other isomer in good yield. The conversion of the 1,2-isomer to the 1,4-isomer is particularly effective, and since, as above pointed out, the 1,4-dichlorobutene-2 isomer is at present considered to be of the greater potential importance, the detailed description and examples of my process below will deal largely with the conversion of the 1,2-dichlorobutene-3 to 1,4-dichlorobutene-2. It should be understood that essentially the same conditions apply for the reverse reaction.

I have further found that the rate of reaction may be increased appreciably by having present in the reaction zone a copper contact material, i. e. either metallic copper or a cuprous or cupric salt, as pointed out in greater detail in my copending application filed the same day as this application; although such a contact material is not effective to catalyze the conversion at room temperature, I have found that it is surprisingly effective for enhancing the conversion at the elevated temperatures at which my process is carried out. This copper contact material which catalyzes the conversion at the elevated temperatures referred to is not a condensation catalyst and accordingly does not tend to catalyze such undesirable side reactions as polymerization or condensation of either of the dichlorobutenes.

As above stated, the process of my invention for transposing one of the dichlorobutenes—1,2-dichlorobutene-3 or 1,4-dichlorobutene-2—to the other isomer involves heating at a temperature of at least about 120° C. I have found that temperatures ranging from 120° C. up to approximately 400° C. are generally advantageous for this conversion. The conversion is generally comparatively slow at the lowest temperature indicated —120° C.—and I find it advantageous, therefore, to use somewhat higher temperatures, e. g. temperatures of about 175° C. or higher. When the heating is accomplished by refluxing at atmospheric pressure, the provision of a jacket to superheat the refluxing vapor or liquid is an effective method of attaining a higher temperature. It should be appreciated, however, that the desired conversion does take place even at 120° C.

The reaction may be carried out either at atmospheric pressure, or at lower or higher pressures. Atmospheric pressure is generally employed for the sake of convenience, except when a somewhat increased pressure is employed as more fully pointed out below to increase the temperature of a refluxing mixture.

In the preferred method of carrying out the process of my invention involving reflux distillation, one of the dichlorobutenes under discussion, for example, 1,2-dichlorobutene-3, is charged to a still and heated under refluxing conditions. Since the 1,2-dichlorobutene-3 isomer boils at about 115° C., some such measure as the use of slightly increased pressure or the provision of a jacket to superheat the refluxing vapor or liquid must be provided to bring the temperature up to 120° C. or above, as required in the process of my invention, at least temporarily at localized points in the liquid or vapor. When the 1,4-dichlorobutene-2 isomer is the starting material, no such measure is necessary since it boils at 145° C. at atmospheric pressure. Reflux distillation in either case is carried out until substantial conversion has been effected, preferably until equilibrium is reached, at which time the boiling point of the reaction mixture will generally be about 132° C. at atmospheric pressure. The refluxed material is then fractionally distilled to separate the two isomers.

The reflux distillation method of carrying out the operation may be carried out continuously, for example when 1,2-dichlorobutene-3 is the starting material, by feeding it to the reflux column and continuously withdrawing mixed liquid dichlorobutenes from the still. When 1,4-dichlorobutene-2 is the starting material the distillation column may be run at partial forward flow instead of full reflux, the higher boiling 1,4-compound may be fed to the still or the lower part of the column and the 1,2-product may be taken off overhead, thereby separating the product continuously from the reaction mixture as it is formed.

When the conversion is brought about by passing the dichlorobutene in vapor form through a heated tube in accordance with another of the preferred methods of carrying out the process of my invention, the desired vaporization of the liquid dichlorobutene may be brought about by passing an inert carrier gas such as nitrogen through the boiling liquid, and thereafter passing the nitrogen - dichlorobutene vapor mixture through a heated tube, which serves as a reaction zone, for example a glass tube heated to the desired temperature. The temperature, of course, may readily be maintained at any point within the range of 120°–400° C. with this method of operation. I have found that a temperature within the range of 175° to 300° C. is particularly advantageous. The exit gases from the heated tube are led through a condenser to liquefy the chloro compounds which are then separated by fractional distillation.

The use of a copper contact material in accordance with the process of my copending application is convenient with either type of operation above described. The solid copper metal or salt may be added as such to the refluxing liquid, or carrier material may be impregnated with the contact substance and this coated carrier added to the liquid. Similarly, the solid contact material, or the carrier coated with conatct material, may be used to pack the hot tube when that particular method of operation is chosen.

The following examples, in which all parts are by weight, are illustrative of the process of my invention:

*Example 1*

50 parts of 1,2-dichlorobutene-3 were placed in a still and subjected to reflux distillation. Heat was supplied by a jacket maintained at a temperature of 175° C. surrounding both the refluxing liquid and a part of the vapor space above the liquid. Portions of the vapor or liquid reflux were maintained at temperatures above 120° C. by this jacket. The temperature of the refluxing liquid, originally 115° C.—the boiling point of the 1,2-dichlorobutene-3 at atmospheric pressure—slowly rose to above 130° C. The refluxed material was thereafter fractionally distilled giving 22.4 parts of unchanged 1,2-dichlorobutene-3, 20.6 parts of 1,4-dichlorobutene-2, and 5.8 parts residue. Thus a yield of 75.2% by weight of 1,4-dichlorobutene-2 was obtained on the basis of the 27.6 parts of 1,2-dichlorobutene-3 attacked.

Example 2

50 parts of 1,2-dichlorobutene-3 and ½ part of cuprous chloride were similarly refluxed employing a bath temperature of 175° C. for 2¼ hours. The liquid after being decanted from the solid catalyst material was fractionally distilled and yielded 21.3 parts of the unchanged 1,2-compound and 27 parts of the 1,4-isomer, representing a yield of 94% of the 1,4-compound on the basis of the 1,2-compound attacked.

Example 3

The process of the last example was followed employing 50 parts of the 1,2-dichlorobutene-3 starting material and .005 part of cuprous chloride. The same bath temperature was employed and the mixture was refluxed for four hours. Upon fractional distillation of the refluxed liquid 17.1 parts of the unchanged 1,2-compound were obtained and 30.3 parts of the 1,4-isomer, representing a conversion of 60.6% of the total 1,2-compound employed and a yield of 92% of the 1,2-compound attacked.

Example 4

100 parts of freshly distilled 1,2-dichlorobutene-3 were heated to boiling and a slow stream of nitrogen bubbled through the boiling liquid. The gaseous mixture was passed through a glass tube heated at 285° C. The exit gases were led through a condenser and the chloro compounds liquefied. Fractional distillation of this condensate gave 63 parts of 1,2-dichlorobutene-3, 25 parts of 1,4-dichlorobutene-2, and 2½ parts of residue. On the basis of the 37 parts of 1,2-dichlorobutene-3 entering into the reaction, the yield of 1,4-dichlorobutene-2 was 67.5% by weight.

The next two examples illustrate the reverse reaction, namely the conversion of 1,4-dichlorobutene-2 into 1,2-dichlorobutene-3.

Example 5

50 parts of freshly distilled 1,4-dichlorobutene-2 were heated at 120° C. for 10 hours and the resulting liquid was fractionally distilled to separate the two isomers. A yield of 78% of the 1,2-dichlorobutene-3 was obtained based on the weight of 1,4-compound attacked.

Example 6

30 parts of 1,4-dichlorobutene-2 and 1 part of cuprous chloride were refluxed as in the above Example 2 for 1½ hours employing a bath temperature of 175° C. The liquid, after being decanted from the solid material, was fractionally distilled, yielding 34.3 parts of unchanged 1,4-dichlorobutene-2, 12.3 parts of 1,2-dichlorobutene-3 and 1.2 parts of residue, representing a yield of about 78.4% by weight of 1,2-dichlorobutene-3 on the basis of the 1,4-compound attacked.

Since certain changes may be made in carrying out the above process without departing from the scope of the invention, it is intended that all matter contained in the above description shall be interpreted as illustrative and not in a limiting sense.

I claim:

1. The process for converting one of the dichlorobutenes 1,2-dichlorobutene-3 and 1,4-dichlorobutene-2 to the other isomer, which consists in heating said dichlorobutene at a temperature of at least 120° C. until the boiling point of the mixture has been substantially changed and separating the resulting mixture of dichlorobutenes.

2. The process for converting one of the dichlorobutenes 1,2-dichlorobutene-3 and 1,4-dichlorobutene-2 to the other isomer, which consists in heating said dichlorobutene at a temperature between about 120° and 400° C. until the boiling point of the mixture has been substantially changed and separating the resulting mixture of dichlorobutenes.

3. The process for converting one of the dichlorobutenes 1,2-dichlorobutene-3 and 1,4-dichlorobutene-2 to the other isomer, which consists in heating said dichlorobutene at a temperature between about 120° and 400° C. until the boiling point of the mixture has been substantially changed and separating by fractional distillation the resulting mixture of dichlorobutenes.

4. The process for converting 1,2-dichlorobutene-3 to 1,4-dichlorobutene-2 which consists in heating the 1,2-dichlorobutene-3 at a temperature between about 120° and 400° C. until the boiling point of the mixture has been substantially changed and separating the 1,4-dichlorobutene-2 from the reaction mixture.

5. The process for converting 1,2-dichlorobutene-3 to 1,4-dichlorobutene-2 which consists in subjecting the 1,2-dichlorobutene-3 to reflux distillation and heating this compound, at least at localized points, to a temperature of at least 120° C. until the boiling point of the mixture has been changed substantially and separating the 1,4-dichlorobutene-2 from the reaction mixture.

6. The process for converting 1,2-dichlorobutene-3 to 1,4-dichlorobutene-2 which consists in passing the 1,2-dichlorobutene-3 in vapor form through a reaction zone maintained at a temperature in the range of about 175° to 300° C. until the boiling point of the mixture has been substantially changed and separating the 1,4-dichlorobutene-2 from the reaction mixture.

7. The process for converting one of the isomeric dichlorobutenes 1,2-dichlorobutene-3 and 1,4-dichlorobutene-2 into a mixture of the two isomers which consists in heating said dichlorobutene at a temperature of at least 120° C. until the boiling point of the resulting mixture is about 132° C. and separating the resulting mixture of dichlorobutenes.

8. The process for converting 1,4-dichlorobutene-2 to 1,2-dichlorobutene-3 which consists in heating 1,4-dichlorobutene-2 at a temperature of at least 120° C. until the boiling point of the mixture has been changed substantially and separating by fractional distillation the 1,2-dichlorobutene-3 from the reaction mixture.

JULIAN A. OTTO.

REFERENCES CITED

The following references are of record in the file of this patent:

UNITED STATES PATENTS

| Number | Name | Date |
|---|---|---|
| 2,083,593 | Muskat | Apr. 28, 1936 |
| 2,242,084 | Nicodemus | May 13, 1941 |

OTHER REFERENCES

Muskat et al., Jour. Am. Chem. Soc., vol. 52, pp. 4043–54 (1930).

Certificate of Correction

Patent No. 2,422,252. June 17, 1947.

JULIAN A. OTTO

It is hereby certified that errors appear in the printed specification of the above numbered patent requiring correction as follows: Column 1, line 8, for "dichrlorobutenes" read *dichlorobutenes*; column 2, line 40, for "reffux" read *reflux*; column 4, line 51, for "conatct" read *contact*; column 6, line 68, for the patent number "2,083,593" read *2,038,593*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*